UNITED STATES PATENT OFFICE.

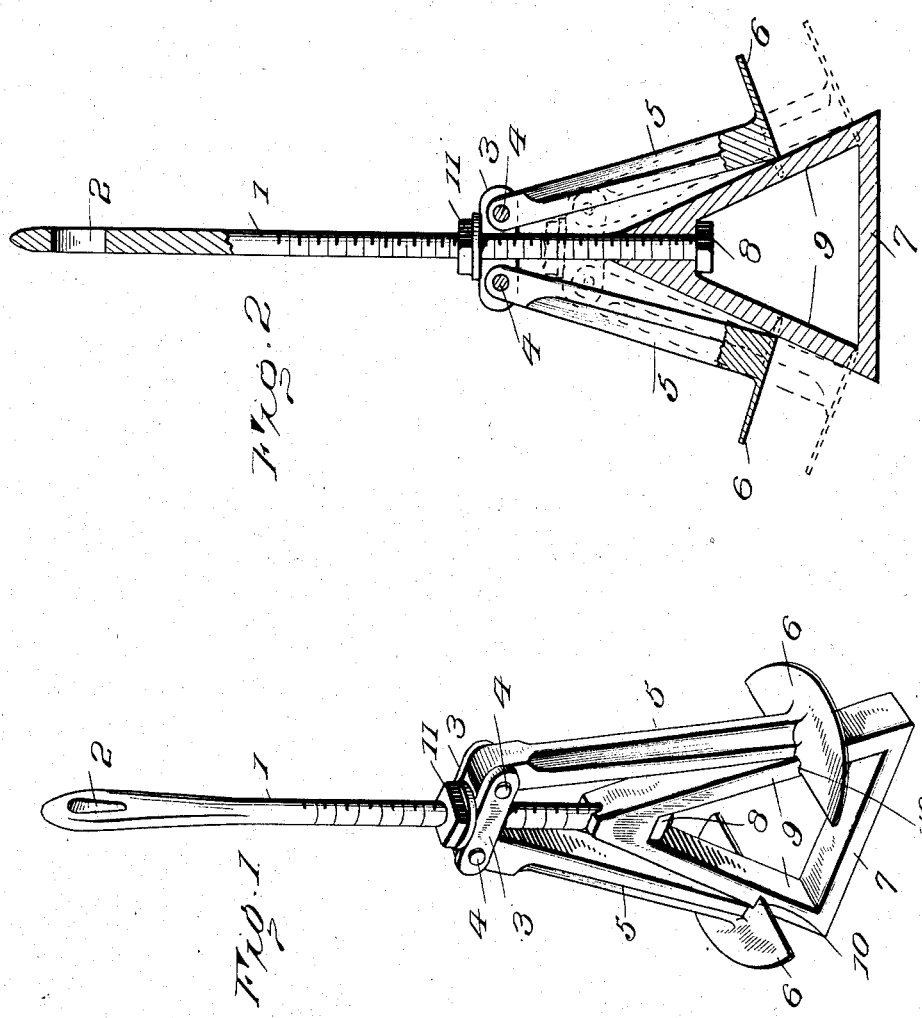

LEMUEL N. STEWART, OF AGENCY, MISSOURI.

GUY-ANCHOR.

No. 864,391.　　　Specification of Letters Patent.　　　Patented Aug. 27, 1907.

Application filed March 1, 1907. Serial No. 359,998.

*To all whom it may concern:*

Be it known that I, LEMUEL N. STEWART, a citizen of the United States, residing at Agency, in the county of Buchanan and State of Missouri, have invented certain new and useful Improvements in Guy-Anchors, of which the following is a specification.

This invention contemplates certain new and useful improvements in guy anchors, and the invention has for its object an improved guy anchor constructed of few and simple parts that will be durable in construction and efficient in operation in holding firmly in soil of all kinds.

The invention consists in certain constructions and arrangements of the parts that I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a perspective view of my improved guy anchor; and, Fig. 2 is a side elevation thereof with parts in section.

Corresponding and like parts are referred to in the following description and indicated in all the views of the drawings by the same reference characters.

Referring to the drawing, the numeral 1 designates the rod or stem of the device which is provided at its upper end with an aperture 2 to receive the guy, cable, or other brace. A cross head is mounted to slide freely on the stem 1, said cross head consisting of two transversely extending spaced links 3 that are joined together at their ends on opposite sides of the stem by means of journals 4. Arms 5 are pivotally suspended at one end between the ends of the links 3 and on said journals 4 and said arms carry blades 6 at their lower ends.

On the lower end of the stem 1, an open frame-like wedge 7 is mounted, said wedge being provided at its apex with an opening through which the stem extends, and the wedge is held on said stem preferably by means of a nut 8 screwed on the lower end of the latter. The legs 9 of the wedge 7 are adapted to fit in recesses 10 formed in the inner edges of the blades 6. 11 designates an adjusting nut which is threaded on the stem 1 and which is provided with a washer and is adapted to bear against the cross head formed by the loops 3, so as to move the stem upwardly relatively to the arms 5 and to draw the wedge 7 upwardly between said arms so as to swing the latter and their blades outwardly and cause them to dig firmly into the soil.

From the foregoing description in connection with the accompanying drawings, it will be seen that in the practical use of my improved guy anchor, the hole in the ground is first prepared of a diameter to permit the blades (which are preferably semicircular as shown) to be inserted downwardly within the hole, when the blades are at the inner limit of their swinging movement. Then the nut 11 is screwed down on the stem 1 by means of a suitable wrench or other tool and this will obviously result in drawing the wedge 7 upwardly between the blades and their arms and result also in the outwardly swinging movement of said blades so as to cause them to dig firmly into the ground and hold the entire guy anchor in place without any liability of slipping.

Having thus described the invention, what is claimed as new is:

1. A guy anchor, comprising a cross head embodying spaced links, a threaded stem passing freely through and between said links, arms pivotally suspended from the links and mounted between the ends thereof, blades connected to the lower ends of said arms, a wedge secured on the lower ends of said stem and adapted to fit between said blades, and a nut screwing on the stem above the links and adapted to move the stem upwardly relatively to the links.

2. A guy anchor, consisting of a threaded stem, a cross head embodying spaced links embracing said stem and slidingly mounted thereon, arms pivotally suspended from said cross head, semicircular blades connected to the lower ends of said arms and provided in their adjacent edges with recesses, an open frame-like wedge secured to the lower end of said stem, and provided with opposite legs adapted to fit in said recesses, and a nut screwing on said stem and adapted to work the stem upwardly relatively to the cross head.

3. A guy anchor, comprising a stem, a cross head embodying spaced links embracing the said stem and slidingly mounted thereon, arms pivotally suspended from said cross head, blades connected to the lower ends of said arms and provided in their adjacent edges with recesses, an open frame-like wedge secured on the lower end of said stem and provided with opposite legs adapted to fit in said recesses, and means for moving said stem upwardly relatively to the cross head.

In testimony whereof I affix my signature in presence of two witnesses.

LEMUEL N. STEWART.

Witnesses:
　H. T. OWSLEY,
　ALLEN L. CHAMBERS.